United States Patent Office

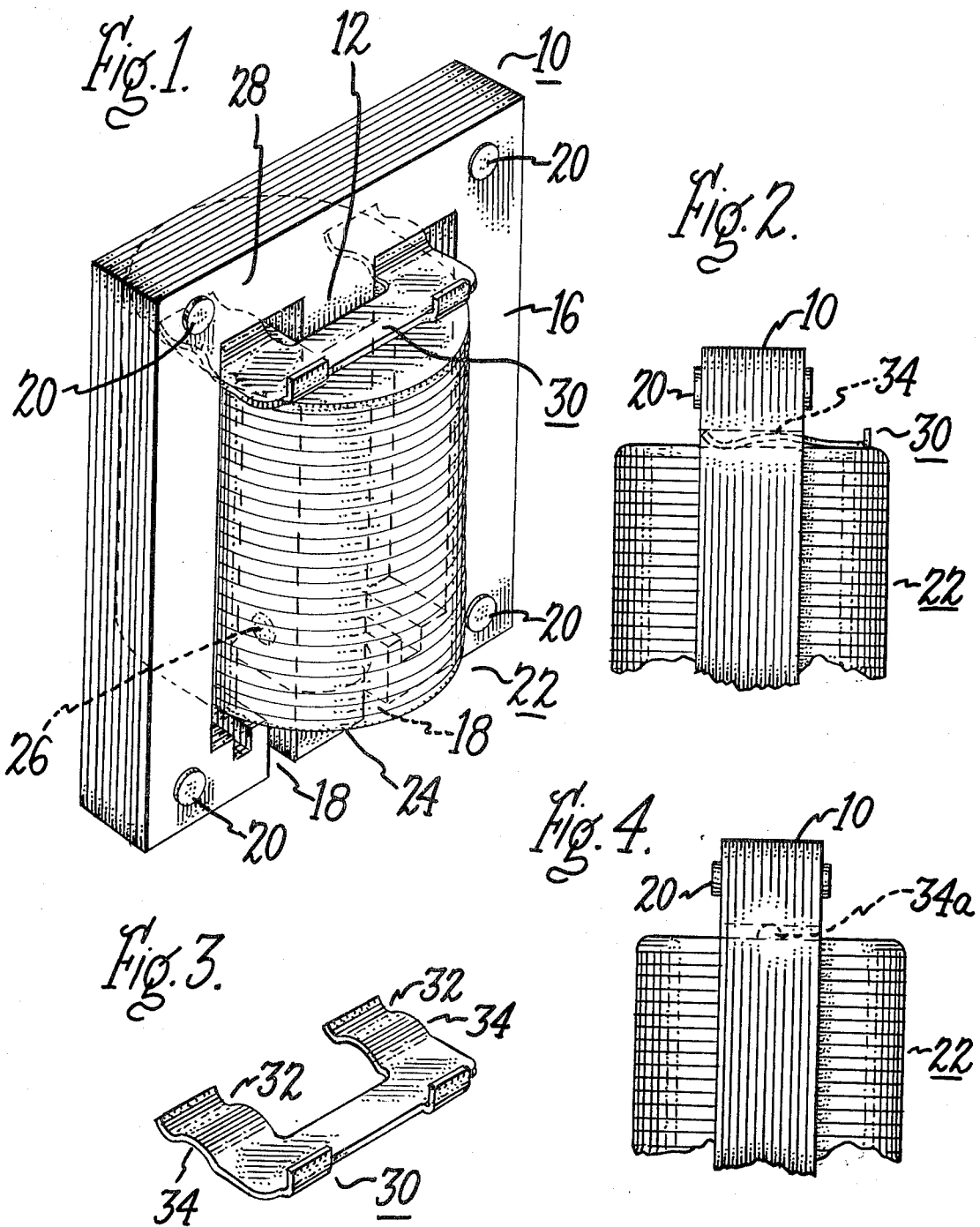

3,706,061
Patented Dec. 12, 1972

3,706,061
INDUCTION WATT-HOUR METER POTENTIAL COIL MOUNTING
Alexander Loika, Jr., Somersworth, N.H., assignor to General Electric Company
Filed June 11, 1971, Ser. No. 152,173
Int. Cl. H01f 27/30
U.S. Cl. 336—197     4 Claims

ABSTRACT OF THE DISCLOSURE

The potential coil of an induction watt-hour meter is encapsulated in an electrically insulating resinous material and mounted on the core leg of the potential electromagnet of the meter. The lower end of the encapsulated coil which is closest to the voltage pole face is generally fixed to the core leg of the electromagnet preferably by a plastic adhesive material. The upper end of the coil is movably held by a spring member or crushable plastic bosses between the top of the encapsulated coil and the yoke portion of the potential electromagnet.

BACKGROUND OF THE INVENTION

This invention relates to coil mounting and more particularly to a novel means of mounting the potential coil of an induction watt-hour meter on the potential electromagnet to allow expansion of the potential coil.

In induction type watt-hour meters, a potential electromagnet and a current electromagnet are provided on opposite sides of a slot or opening in which moves the induction disc. The potential electromagnet is usually formed from a plurality of E-shaped core laminations which are secured together such as, for example, by riveting. The potential or voltage winding is mounted on the center or winding leg with the lower end of such winding leg which is remote from the yoke providing a voltage flux pole. The potential or voltage coil is usually encapsulated in an electrically insulating resin to improve its dielectric strength. The potential coil is normally secured to the winding leg often by use of an adhesive material which is normally applied randomly between the inner opening of the encapsulated coil and the winding leg.

As is well known, all types of plastics tend to absorb moisture, especially under high humidity conditions. As moisture is absorbed, the plastic material tends to swell or expand. When a potential coil is encapsulated in a plastic material, it also has a tendency to expand from absorbed moisture, especially when used in high humidity areas. When the encapsulated coil expands, it often expands in the downward direction toward the voltage flux pole and the main air gap of the potential electromagnet. As will be understood, should the voltage coil expand into the air gap, it would affect the calibration of the induction watt-hour meter. In order to prevent expansion of the encapsulated potential coil from affecting the calibration of the meter, it is necessary to provide for the expansion of the coil toward the yoke of the voltage or potential electromagnet. It is towards this end that this invention is directed.

It is, therefore, one object of this invention to provide a novel means of securing a potential coil to a potential electromagnet.

A still further object of this invention is to provide a novel means of mounting a potential coil to a potential electromagnet which will prevent the coil from expanding towards the voltage flux pole.

A still further object of this invention is to provide a novel means of securing a potential coil to a potential electromagnet such that the end nearest the voltage flux pole is generally fixed while the other end is free to expand as necessary.

A still further object of this invention is to provide a novel means of securing a potential coil to a potential electromagnet wherein the end of the coil closest to the voltage flux pole is fixed while the opposite end is movably mounted by means which will allow expansion against such means.

SUMMARY OF THE INVENTION

In carrying out this invention in a preferred form, the potential coil of an induction watt-hour meter is first encapsulated in an electrically insulating resinous material. The encapsulated potential coil is then assembled on the winding leg of a potential electromagnet. The lower end of the encapsulated potential coil is generally secured to the lower end of the winding leg adjacent the voltage flux pole. In the preferred form, a resinous adhesive material is utilized for securing the lower portion of the potential coil to the lower portion of the winding leg. The remaining area of the encapsulated coil, including the opposite end, are not attached to the voltage winding leg thereby allowing the potential coil to expand in an upward direction toward the yoke of the potential electromagnet.

In one preferred construction, a spring means is provided between the top of the encapsulated potential coil and the yoke of the potential electromagnet to movably secure the potential coil and prevent undesired movement thereof.

An alternate preferred embodiment utilizes crushable plastic bosses formed on the encapsulated coil and in contact with the yoke of the electromagnet.

The invention sought to be protected will be clearly pointed out and distinctly claimed in the claims appended hereto. However, it is believed that this invention and the manner in which its various objects and advantages are obtained as well as other objects and advantages thereof will be more clearly understood by reference to the following detailed description of the present preferred embodiments, particularly when considered in the light of the accompanying drawing.

BRIEF DESCRIPTION OF DRAWING

FIG. 1 is a perspective view of an encapsulated potential coil and a potential electromagnet assembled according to the preferred embodiment of this invention;

FIG. 2 is a partial side view of the assembly shown in FIG. 1;

FIG. 3 is a perspective view of a spring member used in one preferred embodiment of this invention; and FIG. 4 is a partial side view similar to FIG. 2, showing an alternate embodiment.

DESCRIPTION OF PREFERRED EMBODIMENT

This invention relates to a novel means of mounting an encapsulated potential coil on the potential electromagnet of an induction watt-hour meter. As such, induction watt-hour meters are well known to those skilled in the art as is shown, for example, in U.S. Pat. 2,930,980. Therefore, for clarity and understanding of this invention, only the encapsulated potential coil and the potential electromagnet will be shown and described. It is believed that the scope of this invention will be more clearly understood by such description.

Referring now to the drawing wherein like numerals are used to indicate like parts throughout, and referring specifically to FIG. 1 thereof, there is shown a prospective view of the assembly of an encapsulated potential coil and the potential electromagnet such as is utilized in an induction watt-hour meter. The potential electromagnet 10 is comprised of a plurality of substantially E-shaped laminations having a central winding leg 12 which ends in a voltage flux pole 14 in a manner well understood by those skilled in the art. The lower end of outer legs 16 extends inwardly toward the voltage flux pole 14 providing air gaps 18 as is well understood. In the form shown, the plurality of laminations are securely fastened by means of rivets 20. An encapsulated potential coil 22 is mounted on winding leg 12 as clearly shown in FIG. 1. In the preferred form of this invention, the lower end 24 adjacent voltage flux pole 14 is securely fastened on winding leg 12. In the presently preferred form, a resinous adhesive material, such as is indicated at 26, is applied between the lower end of encapsulated potential coil 22 and the lower end of winding leg 12.

As earlier discussed when the resinous material encapsulating potential coil 22 absorbs moisture, the coil tends to expand. By securing the lower end of the coil to winding leg 12, for example, by adhesive 26, the coil 22 will be forced to expand in an upward direction toward the yoke portion 28 of potential electromagnet 10. However, because of vibration and other movement of the electromagnet 10, the coil 22 has a tendency to move or wobble on winding leg 12. To prevent such movement, means are provided to releasably or movably secure the upper end of coil 22 to yoke portion 28 of potential electromagnet 10. Two alternate means that are used in the present preferred form of the invention are shown in the drawing.

In one embodiment of the preferred form of the invention a spring member 30, best shown in FIG. 3 is provided. As shown in FIG. 3, spring member 30 is a U-shaped member having extended legs 32 with each of the legs 32 having a raised central portion 34, as shown. As can best be seen in FIGS. 1 and 2, spring member 30 is mounted on the top of encapsulated coil 22 and the legs 32 extend into the windows of the potential electromagnet 10 on opposite sides of winding leg 12. As is clearly shown in FIGS. 1 and 2, the legs 32 are between yoke portion 28 of electromagnet 10 and the top of encapsulated coil 22. The raised portions 34 of legs 32 are pressed against the iron of yoke portion 28 while the opposite ends of the legs are pressed against the plastic encapsulating material of encapsulated coil 22. As can be seen, particularly in FIG. 2, as potential coil 22 expands, it can expand upwardly against spring 30 with the raised portion 34 allowing for such expansion.

In a second embodiment, raised plastic bosses 34a are formed on the top of encapsulated coil 22 as is best seen in FIG. 4. As will be understood, the plastic bosses 34a, only one being shown, will contact yoke portion 28 of electromagnet 10, when encapsulated coil 22 is secured to winding leg 12. This relationship is clearly shown in FIG. 4. The plastic bosses 34a are formed of the same electrically insulating material as is used to encapsulate coil 22 and are sized to be crushable against the yoke 28 when the coil 22 expands in an upward direction. Obviously, the size and shape of the bosses 34a will depend on the material used.

While there has been shown and described the present preferred embodiments of the invention, it will be understood that various changes may be made in specific details thereof without departing from the spirit and scope of the invention. For example, different shapes of potential coils may be utilized and different types of springs may be used as desired. It is intended by the claims appended hereto to include all such changes as are within the spirit and scope of the invention hereinabove described.

What is claimed as new and which is desired to secure by Letters Patent of the United States is:

1. A potential coil and electromagnet assembly for an induction watt-hour meter, said coil being encapsulated in a resinous material, said electromagnet having a central winding leg and a pair of outer legs, said central winding leg having a flux pole at one end and said outer legs having ends extending toward said flux pole to provide air gaps, said potential coil mounted on said central winding leg and adhesive means securely fastening the end of said potential coil nearest said air gaps to said winding leg to prevent movement of said coil toward said air gap and means movably securing the other end of said coil to said electromagnet.

2. A potential coil and electromagnet assembly as set forth in claim 1 in which said means movably securing said other end of said coil to said electromagnet is a spring device.

3. A potential coil and electromagnet assembly as set forth in claim 2 in which said spring device is a U-shaped member having the legs of said U-shaped member between said other end of said coil and said electromagnet.

4. A potential coil and electromagnet assembly as set forth in claim 1 in which said other end of said coil is movably secured to said electromagnet by crushable plastic bosses formed in said resinous material.

References Cited

UNITED STATES PATENTS

| | | | |
|---|---|---|---|
| 3,346,828 | 10/1967 | Boschman | 336—197 X |
| 3,195,024 | 7/1965 | Conraty | 335—257 |
| 3,127,581 | 3/1964 | Rasmussen | 336—197 |
| 2,064,772 | 12/1936 | Vogt | 336—197 X |
| 2,521,533 | 9/1950 | Mittermaier | 336—197 X |
| 2,266,618 | 12/1941 | Stimson | 336—197 X |
| 1,996,606 | 4/1935 | Ayers | 336—197 X |
| 2,930,980 | 3/1960 | Scamman et al. | 324—137 |

THOMAS J. KOZMA, Primary Examiner

U.S. Cl. X.R.

336—197, 205